United States Patent [19]

Asakura et al.

[11] 4,188,442

[45] Feb. 12, 1980

[54] ADHESIVE TAPE

[75] Inventors: Hiroshi Asakura; Ippei Chimura; Keisuke Kitazume; Yoshiyuki Kaneko; Shirou Fuse; Akio Ueno, all of Kamakura, Japan

[73] Assignee: Toyo Kagaku Kabushiki Kaisha, Kamakura, Japan

[21] Appl. No.: 920,648

[22] Filed: Jun. 30, 1978

Related U.S. Application Data

[63] Continuation-in-part of Ser. No. 850,218, Nov. 10, 1977.

[30] Foreign Application Priority Data

Dec. 28, 1976 [JP] Japan ............................ 51-157575
Apr. 30, 1977 [JP] Japan ............................ 52-49077

[51] Int. Cl.² .................................................. B32B 7/02
[52] U.S. Cl. .................................... 428/216; 428/218; 428/343; 428/354; 428/516; 428/910
[58] Field of Search ............ 428/216, 195, 343, 203, 428/211, 354, 332, 334, 200, 910, 218, 516, 517

[56] References Cited

U.S. PATENT DOCUMENTS

| | | | |
|---|---|---|---|
| 3,088,848 | 5/1963 | Tritsch | 428/343 |
| 3,118,534 | 1/1964 | Groff et al. | 428/352 |
| 3,620,366 | 11/1971 | Parkinson et al. | 428/343 |
| 3,936,565 | 2/1976 | Good | 428/315 |
| 4,022,646 | 5/1977 | Casey | 428/218 X |

Primary Examiner—Thomas J. Herbert, Jr.
Attorney, Agent, or Firm—Paul J. Sutton

[57] ABSTRACT

An adhesive tape is provided which comprises a base paper material having a thickness of 30 to 150 g/m², a film of high density polyethylene having a density of not less than 0.94 g/cc elongated at least six times only transversely to the longitudinal direction of the tape and having a thickness of 15 to 30μ, said elongated film being attached to one side of said base paper material with a first layer of low density polyethylene of a thickness of 7 to 50μ being extruded between the base paper material and the elongated film, a second layer of low density polyethylene of a thickness of 7 to 50μ being extruded and attached to said elongated film so that the elongated film is sandwiched between the first and second layers of low density polyethylene, and a layer of pressure sensitive adhesive applied to the other side of said base paper material. The adhesive tape has a high tensile strength against a force applied in a direction transverse to the longitudinal direction of the tape. Nevertheless, the tape can be easily torn or cut by user's hand or hands exactly transversely to the longitudinal direction of the tape without being torn zigzag or in a slanting direction.

6 Claims, 2 Drawing Figures

ADHESIVE TAPE

CROSS-REFERENCE TO RELATED APPLICATION

This application is a continutation-in-part of application Ser. No. 850,218 filed on Nov. 10, 1977.

BACKGROUND OF THE INVENTION

1. Field of the Invention

This invention relates to an adhesive tape, and more particularly to an adhesive tape which may be conveniently used as a sealing tape for containers made of, for example, corrugated cardboard.

2. Prior Art

An adhesive tape for sealing, for example corrugated cardboard containers has been known in which paper, fabrics, a polypropylene film or a polyvinyl chloride film is used as a substrate, a pressure sensitive adhesive being applied to one side or both sides of the substrate. The adhesive sealing tape of the type in which paper is used as a substrate is not strong enough to seal containers filled with relatively heavy contents. Accordingly, a reinforced paper backed with various plastic films or fabrics has been used as a substrate material. However, the reinforced paper adhesive tape has drawbacks that it is quite difficult to cut by hand or hands and even if it can, the tape has a tendency to cut zigzag or in a slanting direction. Therefore, one has to utilize a special cutting device, which results in inefficient packing operation. In addition, when a reinforcing plastic film or fabric is adhered to the substrate paper, it is generally required to use a special adhesive or primer due to weak affinity between the reinforcing material and the substrate paper. Consequently, complicate steps for applying adhesives and for recovering solvents are necessarily involved for the production of such reinforced paper adhesive tape. In the meanwhile, the adhesive sealing tape of the type in which a polypropylene film or a polyvinyl film is used as a substrate, has inferior properties at low temperature such as brittleness. Furthermore, polyethylene or polyvinylchloride has large stiffness as shown by bending test as well as large coefficient of tensile elasticity at an elongation of 5%. Hence, when the tape comprising a film of these materials is used for sealing packages containing cold contents such as frozen food or used under low temperatures, the bent portions of the tape tends to stretch so that the tape gets turned or tucks up and peels off out of the packages.

OBJECTS AND SUMMARY OF THE INVENTION

It is an object of the present invention to provide an adhesive tape which can be easily cut by user's hand or hands exactly in a transverse direction to the longitudinal direction of the tape and which nevertheless has a high tensile strength against a force applied in the same direction.

It is another object of the present invention to provide an adhesive tape having an outermost layer on which surface the tape can be adhered or applied so as to overlap one upon another.

It is still another object of the present invention to provide an adhesive tape provided with an outermost layer which surface has appropriate releasing properties and frictional properties.

It is yet another object of the present invention to provide an adhesive tape having an outermost layer on which markings such as figures or letters can be applied.

It is a further object of the present invention to provide an adhesive tape which is cheap and therefore can be widely used.

It is a further object of the invention to provide an adhesive tape which can be produced in a simple manner.

It is a still further object of the invention to provide an adhesive tape which has excellent coldproof properties.

These and other objects of the invention will become apparent with reference to the following description.

An adhesive tape of the invention comprises a base paper material having a thickness of 30 to 150 g/m$^2$, a film of high density polyethylene having a density of not less than 0.94 g/cc elongated at least six times only transversely to the longitudinal direction of the tape and having a thickness of 15 to 30μ, said elongated film being attached to one side of said base paper material with a first layer of low density polyethylene of a thickness of 7 to 50μ being extruded between the base paper material and the elongated film, a second layer of low density polyethylene of a thickness of 7 to 50μ being extruded and attached to said elongated film so that the elongated film is sandwiched between the first and second layers of low density polyethylene, and a layer of pressure sensitive adhesive applied to the other side of said base paper material.

DESCRIPTION OF THE INVENTION

Figure 1:
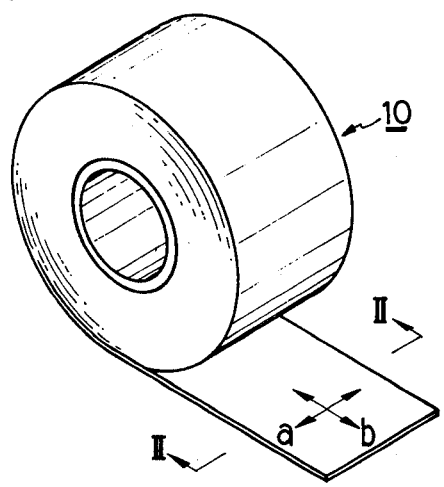
FIG. 1 is a perspective view showing an adhesive tape of rolled type according to the invention.
Figure 2:
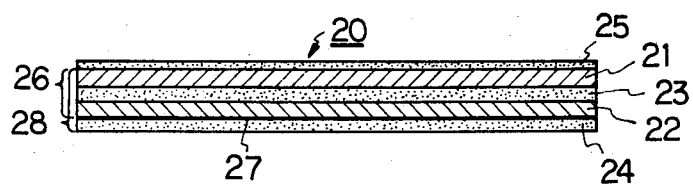
FIG. 2 is a schematic sectional view taken along line 2—2 of FIG. 1.

Referring to FIG. 1, an adhesive tape of rolled type is generally indicated by reference numeral 10. It is, however, to be understood that the adhesive tape according to the invention is not limited only to the rolled type. In FIG. 2, an adhesive tape 20 comprises a base paper material 21, a film of high density polyethylene 22, a first layer 23 of low density polyethylene, a second layer 24 of low density polyethylene and a layer 25 of pressure sensitive adhesive.

In the adhesive tape of the invention it is of great importance that a film of high density polyethylene having a density of not less than 0.94 g/cc elongated at least six times, preferably ten times only transversely to the longitudinal direction of the tape be used. In this connection, it is to be noted that "transversely or a transverse direction" herein referred to means a direction a shown by an arrow in FIG. 1, whereas "longitudinally or a longitudinal direction" herein referred to means a direction b denoted by an arrow in FIG. 1 which crosses at a right angle with the arrow a. The reason why a high density polyethylene film of not less than 0.94 g/cc is used according to the invention is that a high strength against a transversely applied force is provided and that this characteristic does not disappear even at low temperatures. That is, the adhesive tape of high density polyethylene of not less than 0.94 g/cc has a stiffness of 8 to 16 g and a coefficient of tensile elasticity at an elongation of 5% of less than 90 kg/mm$^2$. Therefore, such tape will not become brittle nor hardened under cold atmosphere so as to be intimately and yet firmly adhered to surfaces to be applied even to bent portions such as corners of a container. When a polyethylene film having a density of less than 0.94 g/cc is used, the advantages above mentioned cannot be obtained.

Furthermore, when the aforementioned high density polyethylene film is elongated only transversely not less than six times, the elongated film has an improved tensile strength against a force applied in a transverse direction and at the same time a lowered tear strength against a force applied in the same direction. Accordingly, the adhesive tape comprising such polyethylene film can be easily torn or cut by user's hand or hands exactly transversely without using cutters. Nevertheless, the tape retains a high tensile strength so that even when a transverse stress acts on the tape, it will not break or peel off. If the high density polyethylene film is elongated not less than ten times, the characteristic properties as set forth can be further enhanced. However, it is not possible to produce an effective elongated film at an elongation above sixteen times.

An adhesive tape having a density of less than 0.94 g/cc and/or elongated below six times in a transverse direction has not only insufficient transverse tensile strength but also high tear strength. Such tape, therefore, has to be cut by cutting devices. Still worse, when a transverse force is applied to the tape, it will easily split in a longitudinal direction.

The film 22 of high density polyethylene has a thickness of 15 to 30μ. In a thickness of less than 15μ, a predetermined strength cannot be obtained. On the contrary, above 30μ, the film losses its flexibility. Accordingly, the adhesive tape cannot adhere intimately onto concaved or convexed surfaces to be applied. Particularly, when the tape is applied to corners of a container, it will peel off due to high restorable properties.

In producing the film 22 of high density polyethylene, polyethylene of a density of not less than 0.94 g/cc is subjected to extrusion molding by means of an extruder equipped with a flat die and thereafter to elongation treatment at least six times in a transverse direction by means of, for example an elongating machine of tenter type.

When producing the laminated adhesive tape 20 shown in FIG. 2, the following procedures may be conveniently used.

Between the film 22 of high density polyethylene produced in the manner as hereinabove described and the base paper material 21, a first layer 23 of low density polyethylene which serves as an adhesive is extruded through an extruder in the known manners and conditions so that the layer 23 is sandwiched between the paper material 21 and the film 22. While passing through laminate rollers, the three layers 21, 22, 23 are adhered one another under pressure to form a three-layer laminate sheet 26. The second layer 24 of low density polyethylene is then extruded through another extruder in the known manners and conditions and adhered onto the surface 27 of the sheet 26 while passing through laminate rollers to form a four-layer laminate sheet 28. Finally, the layer 25 of pressure sensitive adhesive is applied to the base paper material 21.

As the base paper material, kraft paper such as clupak kraft paper may preferably be used although any other paper known in the art can be utilized. The thickness of the paper may be between 30 and 150 g/m², preferably 40 and 100 g/m².

Commercially available low density polyethylene may be conveniently utilized for materials of the first and second layers 23 and 24. The first layer 23 functions as an adhesive for the paper material 21 and a film 22 of high density polyethylene and may have a thickness of 7 to 50μ, preferably 10 to 35μ. The second layer 24 forms an outermost layer of the adhesive tape 20 according to the invention. Since low density polyethylene is used, the outermost or second layer 24 has appropriate releasing properties. Hence, when the tape is in the form of a roll as shown in FIG. 1, the tape 20 can be easily peeled off from the roll 10. Nevertheless, the tape may be applied or adhered by overlapping one upon another since the second layer 24 has also appropriate adhering properties. Therefore, containers can be firmly sealed. Furthermore, the layer 24 has proper frictional properties so that when applied to containers, they may be stacked without the danger of being fallen down. In addition, if desired, markings such as figures or letters may be applied to the outer surface of the second layer 24. The second layer 24 may have a thickness of 7 to 50μ, preferably 10 to 35μ.

The pressure sensitive adhesive 25 which is used according to the invention includes a solvent type such as rubber system or acryl system, an emulsion type such as acryl system or vinylacetate system and a hot-melting type such as EVA systems (ethylenevinyl acetate system), rubber system or rubber polyamide resin system. The adhesive may be directly applied to the base paper material 21 whether the solvent type or emulsion type adhesive may be used if applied at a temperature below 120° C. In case of adhesive which cannot be adhered above 120° C., the transferring method can preferably be used whether the adhesive is of the solvent type, the emulsion type or of the hot-melting type above referred to. Of the hot-melting type adhesives, the rubber system consisting of the following commercially available products may be preferred;

| Cariflex TR 110 7 | (Shell Chemical) |
|---|---|
| Polybutene LV-100 | (Nisseki Resin Chemical) |
| Arkon M 100 | (Arakawa Rinsan Chemical) |
| Shellflex 371 | (Shell Chemical) |
| Anti-Oxidant BZ | (Ouchishinkoh Chemical) |

The acryl system of the emulsion type adhesive such as sold under the trade name "Nikasol TS TB 3" by Nippon Garbide Kogyo K.K. including polyacrylate system may be most preferably used, utilizing the transferring method. The thickness of the pressure sensitive adhesive layer 25 may preferably be between 5μ and 200μ.

The adhesive tape according to the invention may be used for teaching materials such as coloured paper if the base paper material 21 is coloured while the first and second layers 23, 24 and the film 22 are transparent or translucent or if the base paper material 21 is white while the film 22 is coloured. In any form, pigments are not exposed on the surface so that the adhesive tape or modified coloured paper is suitable for children's use from sanitary standpoint of view. The adhesive tape can also be utilized for labels if the base paper material 21 is printed to form patterns, figures, letters or a combination thereof on its surface.

THE EXAMPLES OF THE INVENTION

EXAMPLE 1

High density polyethylene having a density of 0.94 g/cc was extruded through a flat die and then elongated transversely eight times by means of an elongating machine of the tender type to obtain a film having a thickness of 18μ.

The film thus obtained was adhered to a base paper material with a layer of low density polyethylene (0.918 g/cc) having a thickness of 20μ being sandwiched between the base paper material and the film and laminated by rollers to obtain a three-layer laminate sheet. As the base paper material, clupak kraft paper having a weight per m² of 78 g/m² was used.

A layer of low density polyethylene (0.918 g/cc) having a thickness of 20μ was extruded and adhered onto the high density polyethylene film of the three-layer laminate sheet to obtain a four-layer laminate sheet.

Then on the paper material of the four-layer laminate sheet a pressure sensitive adhesive was applied by means of the transferring method to have a thickness of 80 g/m² and dried at 135° to 160° C. The tapes obtained was wound up to form a roll and cut to have a width of 50mm. As the pressure sensitive adhesive, the acryl system of the emulsion type adhesive having the following composition was used:

|  | Parts by wt. |
| --- | --- |
| 50% solution of polyacrylate emulsion | 100 |
| Cumarone resin | 5 |
| Ester gum | 5 |
| Benzohexatoluene | 2 |

The adhesive tapes thus obtained were subjected to various experiments. The result is given in Table I.

Table I

| Test | The adhesive tape according to the invention | | Known kraft adhesive tape | Known reinforced paper adhesive tape | Known fabric adhesive tape |
| --- | --- | --- | --- | --- | --- |
| Temperature (°C.) | 20 | −20 | 20 | 20 | 20 |
| Transverse tensile strength (kg/10mm in width) | 13.1 | 13.9 | 4.7 | 6.8 | 7.8 |
| Transverse elongation (%) | 19.0 | 15.0 | 5.0 | 10.9 | 6.8 |
| Transverse tear strength (g) | 300 | 313 | 280 | 550 | 720 |
| The conditions of cut edges | Good | Good | Poor | Poor | Good |

In the experiments in Table I, the transverse tensile strength and the transverse elongation were determined according to Japanese Industrial Standard (Hereinafter referred to as JIS)Z-1523. The transverse tear strength was determined according to JIS L-1004. The conditions of cut edges were determined by observing the edges of the tapes torn at a rate of 30 m/mm, each tape having had a notch of 3mm in a transverse direction from the edge. "Good" means that the tape was torn exactly transversely, whereas "Poor" means that the tape was almost not torn transversely.

For the purpose of comparison, a kraft adhesive tape, a reinforced paper adhesive tape and a fabric adhesive tape commercially available under trade names "Nittoch Kraft Tape 7100", "Krapack 7150" and "Nittoh Nuno Tape" (Each produced by Nittoh Denki Kogyo K.K.), respectively were used.

From Table I it can be seen that the adhesive tape of the invention has transverse tensile strength several times as strong as the known kraft adhesive tape. Furthermore, the paper adhesive tape of the invention has larger transverse tensile strength than the known reinforced paper adhesive tape which are used for sealing containers containing heavy contents. The transverse tear strength of the paper adhesive tape according to the invention can be torn exactly in a transverse direction with a force almost equal to that required for the kraft adhesive tape of the known type. In addition, the strengths at room temperature are almost the same as those at −20° C.

EXAMPLE 2

The adhesive tapes were made in the same manner as in Example 1 except that the high density polyethylene films were elongated at various magnification.

The result is given in Table II.

Table II

| Magnification of transverse elongation | Transverse tensile strength (kg/10mm in width) | Transverse tear strength | The conditions of cut edges |
| --- | --- | --- | --- |
| 0 | 5.4 | 535 | Poor |
| 4 | 6.7 | 585 | * |
| 6 | 9.8 | 317 | Good |
| 8 | 11.7 | 292 | " |
| 10 | 12.9 | 298 | " |
| 12 | 13.2 | 282 | " |
| 14 | 13.9 | 288 | " |

Note:
* 10% of the test samples were not torn in a transverse direction. The conditions of the cut edges were determined in accordance with Example 1.

As shown in Table II, with a magnification of transverse elongation of not less than six, satisfactory results are obtained.

Further experiments were effected using the same adhesive tapes. However, the thickness of the high density polyethylene film was varied. The result is shown in Table III.

Table III

| | Transverse tensile strength (kg/10mm in width) | | | |
| --- | --- | --- | --- | --- |
| Thickness (mm) | Magnification of tensile elongation 6 | 8 | 10 | 12 |
| 0.008 | 5.5 | 6.0 | 6.2 | — |
| 0.010 | 6.8 | 7.7 | 7.9 | 8.4 |
| 0.020 | 9.8 | 11.7 | 12.9 | 13.7 |
| 0.030 | 9.7 | 12.5 | 12.7 | 14.4 |
| 0.040 | 10.4 | 14.1 | 14.9 | 16.4 |

Table III-continued

| Thickness (mm) | Transverse tensile strength (kg/10mm in width) | | | | |
|---|---|---|---|---|---|
| | Magnification of tensile elongation | 6 | 8 | 10 | 12 |
| 0.060 | | 11.2 | 15.4 | 16.2 | 17.7 |

Note: The tensile strength was determined according to JIS Z-1523.

With the adhesive tape comprising a film of a thickness of less than 0.010mm, a satisfactory transverse tensile strength was not obtained. On the other hand, with the adhesive tape having a film of a thickness of more than 0.050mm, favourable flexibility was not attained.

EXAMPLE 3

The adhesive tapes each having a width of 50mm were made in the same manner as in Example 1. The adhesive tapes were applied to a whole upper surface (41×43 cm) of a corrugated cardboard container having a height of 25 cm. To a whole bottom surface (41×43 cm) of another container of the same size and material, the adhesive tapes were applied. The two containers were stacked so that the upper surface contacts with the bottom surface. Each container was loaded to weigh 25 kg.

The two vertically stacked containers were inclined gradually and the angles at which the upper stacked container starts to slide down were measured. The result is given in Table IV.

Table IV

| Tape applied | Angle (°) |
|---|---|
| Without tape | 32.6 |
| Known Kraft adhesive tape | 9.4 |
| Known fabric adhesive tape | 27.4 |
| Adhesive tape of the Invention | 31.9 |

Note: Known Kraft adhesive tape and fabric adhesive tape are the same as used in Example 1.

From Table IV it will be understood that the adhesive tapes of the invention have good frictional properties.

EXAMPLE 4

An adhesive tape having no second layer of low density polyethylene was made for the purpose of the comparison as follows:

High density polyethylene having a density of 0.96 g/cc was extruded through a flat die and then elongated transversely ten times by means of an elongating machine of the tenter type to obtain a film having a thickness of 20μ.

The film thus obtained was adhered to a bass paper material with a layer of low density polyethylene having a thickness of 15μ being sandwiched between the base paper material and the film and laminated by rollers. As the base paper material, clupak kraft paper having a weight per m² of 73 g/m² was used.

Then on the other side of the paper material a pressure sensitive adhesive was applied by means of a coating machine to have thickness of 40μ and dried at 110° to 130° C. The tapes thus obtained was wound up to form a roll and cut to have a width of 10 mm. The pressure sensitive adhesive has the following compositions:

| Natural rubber - MMA-AN graftpolymer | 4.1 parts by wt. |
|---|---|
| Terpene resin | 1.8 parts by wt. |
| Zinc white | 0.15 parts by wt. |
| Trimethylthiuram disulfide | 0.06 parts by wt. |
| Toluene | 6.0 parts by wt. |

The adhesive tapes of the invention were made in the same manner as in Example 1 except that the roll was cut to have a width of 10 mm.

The strengths required for peeling the tapes off the rolls were measured. The result is given in Table V.

Table V

| Tape | Strength for peeling (g) |
|---|---|
| Com. Ex. | Impossible to peel off |
| Tape according to the Invention | 220 |

From Table V it will be noted that the adhesive tapes of the present invention have appropriate releasing properties.

Although the present invention has been described with reference to preferred embodiments and examples, various modifications and variations can be made without departing from the spirit of the invention. It is intended that all these modifications and variations be included.

What is claimed is:

1. An adhesive tape comprising a base paper material having a thickness of 30 to 150 g/m², a film of high density polyethylene having a density of not less than 0.94 g/cc elongated six to sixteen times only transversely to the longitudinal direction of the tape and having a thickness of 15 to 30μ, said elongated film being attached to one side of said base paper material with a first layer of low density polyethylene of a thickness of 7 to 50μ being extruded between the base paper material and the elongated film, a second layer of low density polyethylene of thickness of 7 to 50μ being extruded and attached to said elongated film so that the elongated film is sandwiched between the first and second layers of low density polyethylene, and a layer of pressure sensitive adhesive applied to the other side of said base paper material.

2. The adhesive tape as claimed in claim 1 wherein said film of high density polyethylene is elongated at least ten times only transversely to the longitudinal direction of the tape.

3. The adhesive tape as claimed in claim 1 wherein said film of high density polyethylene is coloured while said base paper material is white.

4. The adhesive tape as claimed in claim 1 wherein said adhesive tape is in the form of a roll.

5. The adhesive tape as claimed in claim 1 wherein said film of high density polyethylene and said first and second layers of low density polyethylene are transparent or translucent while said base paper material is coloured.

6. The adhesive tape as claimed in claim 5 wherein said coloured base paper material has printed patterns, figures, letters or a combination thereof on its surface.

* * * * *